United States Patent [19]

McCarroll

[11] 4,141,879
[45] Feb. 27, 1979

[54] THERMOPLASTIC ALLOY

[76] Inventor: Glenn G. McCarroll, 38315 Hidden Lane, Mt. Clemens, Mich. 48043

[21] Appl. No.: 932,325

[22] Filed: Aug. 9, 1978

Related U.S. Application Data

[63] Continuation-in-part of Ser. No. 819,902, Jul. 28, 1977, abandoned.

[51] Int. Cl.$^2$ .............................................. C08L 77/00
[52] U.S. Cl. .......................... 260/37 N; 260/857 TW
[58] Field of Search ........ 260/37 N, 33.8 R, 857 TW, 260/858

[56] References Cited

U.S. PATENT DOCUMENTS 3,249,563  5/1966  Balk ................................... 260/37 N
4,062,819  12/1977  Mains et al. .................. 260/857 TW

FOREIGN PATENT DOCUMENTS 41759  7/1974  France ...................................... 260/858

99355  9/1974  Japan ................................... 260/37 N

Primary Examiner—Lewis T. Jacobs
Attorney, Agent, or Firm—Cullen, Sloman, Cantor, Grauer, Scott & Rutherford

[57] ABSTRACT

The present invention provides a thermoplastic material for use under conditions demanding high strength at elevated temperatures, e.g., for under-the-hood automotive or truck components.

The material is essentially a three-component alloy of a homopolymer polyamide, a copolymer polyamide, and polyurethane reinforced with a relatively small amount of glass fibers and containing normal amounts of heat stabilizers, ultraviolet screen materials, etc. The material can be formed by any conventional forming method, e.g., by extrusion, injection molding, blow molding, vacuum forming, and the like. Finished articles made from the material are characterized by elevated deflection temperatures (400° F at 66 psi and 300° F at 264 psi) and high tensile and flexural strengths.

2 Claims, No Drawings

THERMOPLASTIC ALLOY

RELATED APPLICATION

This application is a continuation-in-part of Ser. No. 819,902 filed July 28, 1977, now abandoned.

BACKGROUND OF THE INVENTION

In recent years, the use of plastics in vehicular applications, both automotive and truck, has increased remarkably. The increased plastic usage has been due primarily to the necessity to reduce the overall weight of vehicle, together with the elimination of expensive machined or die cast metal components. Automative requirements place stringent demands upon the plastic materials used in vehicles, but perhaps the most stringent demands are those for under-the-hood uses. Conditions within the engine compartment are particularly difficult due to the temperature variations which may be encountered. Temperatures may run as high as 400° F. and as low as −50° F.

One typical example is a conduit extending through a truck engine compartment to connect an exterior air cleaner or filter to the engine air intake. Such a conduit is exposed to the widely variant temperatures within the engine compartment, while at the same time it must be able to withstand the collapsing forces exerted thereon if the air filter were to be completely blocked by accreted contaminants while the engine is still running and drawing a vacuum in the conduit. Prior to the present invention, such conduits were machined steel castings, due to the stringent strength-at-temperature requirements.

It would be desirable to manufacture such a conduit by blow molding from a plastic composition, if a composition could be provided having the necessary high melt point, tensile strength, flexural strength and ability to resist deflection at elevated temperatures.

BRIEF SUMMARY OF THE PRESENT INVENTION

The present invention now provides such a composition which, in essence, is an alloy of a homopolymer polyamide, such as 6/6 nylon, a copolymer polyamide, such as a copolymer of 6/6 nylon and 6 nylon, and polyurethane. This alloy has incorporated therein a minimal amount, on the order of 4% to 12% by weight of chopped gas fibers, plus the normal heat stabilizers, ultraviolet train components, and the like.

The composition of the present invention is a thermoplastic alloy and can be processed by any desired, normal thermoplastic processing technique. Components from the composition can be injection molded, extruded, blow molded, vacuum formed and the like. Particularly interesting is the blow molding aspect of the composition since it makes possible the formation of complex shapes, such as the above described conduit from a freely extruded, tubular parison.

The composition possesses a unique combination of physical properties and thermal properties summarized in the following table:

| | |
|---|---|
| Specific Gravity | 1.105 |
| Melt Point (F) | 410–420 |
| Tensile Strength (PSI) | 21,500 |
| Tensile Yield(PSI) | 19,200 |
| Flexural Strength (PSI) | 16,500 |
| Flexural Modulus (PSI) | 425,000 |
| Notch Izod Impact Strength (FT.LBS./IN.) | 1.8 |
| Deflection Temp. at 66 psi | 400 F |
| at 264 psi | 300 F |
| at 264 psi | −50 F |

DETAILED DESCRIPTION OF THE INVENTION

As above explained, the composition of the present invention is an alloy having three essential components, falling within the following limits:

| Component | Percent By Weight |
|---|---|
| Homopolymer Polyamide | 15 – 26 |
| Copolymer Polyamide | 35 – 65 |
| Urethane | 9 – 18 |
| Chopped Glass Fiber | 2 – 12 |

Also incorporated into the composition is a heat stabilizer for the polyamide, generally a copper halide, such as copper chloride, copper fluoride, or copper iodide in an amount ranging from about one-half to about one and one-half percent; an ultraviolet screen material such as carbon black in an amount ranging from about one percent to about two percent; isocyanate (such as Uroflex R 07 - 06 resin available from BASF Wyandotte Corp. of Wyandotte, Michigan) in an amount ranging from 0.25% to 1.25% Isocyanate; and methylene chloride (available from Product Sol of Birmingham, Michigan) in an amount ranging from 0.25% to 1.25%.

The alloy also has unusual chemical resistance in that it is unaffected by aromatic hydrocarbons, aliphatic hydrocarbons, oil, gasoline, grease, ketones and esters.

As a preferred compound falling within the above-identified generic composition above-given, the following is presented:

| Ingredient | Percent By Weight |
|---|---|
| 6/6 Nylon | 26 |
| 6/6 Nylon plus 6 Nylon | 55 |
| Polyurethane | 11 |
| Heat Stabilizer | 1 |
| Isocyanate | 1 |
| Methylene Chloride | 1 |
| Chopped Glass Fibers | 3 |
| Carbon Black | 2 |

I claim as my invention:

1. A thermoplastic molding compound consisting essentially of from 15%–26% of a homopolymer polyamide, from 35%–65% copolymer polyamide, 9%–18% polyurethane, from 2%–12% chopped glass fibers, from 1/2%–1.5% metallic heat stabilizers, 0.25% to 1.25% isocyanate, 0.25% to 1.25% methylene chloride, and from 1%–2% carbon black.

2. A thermoplastic molding alloy consisting essentially of about 26% homopolymer polyamide, about 55% copolymer polyamide, about 11% polyurethane, about 3% chopped glass fibers, about 1% copper halide heat stabilizer, about 1% isocyanate, about 1% methylene chloride, and about 2% carbon black having the following properties, as molded:

| | |
|---|---|
| Specific Gravity | 1.105 |
| Melt Point | 410–420 |
| Tensile Strength (PSI) | 21,500 |
| Tensile Yield (PSI) | 19,200 |
| Flexural Strength (PSI) | 16,500 |
| Flexural Modulus (PSI) | 425,000 |
| Notch Izod Impact Strength (FT.LBS./IN.) | 1.8 |
| Deflection Temp. at 66 psi | 400 F |
| at 264 psi | 300 F |
| at 264 psi | −50 F |

* * * * *